United States Patent Office 3,554,932
Patented Jan. 12, 1971

3,554,932
PRODUCTION OF FOAMED THERMOPLASTIC
Robert H. Overcashier, Walnut Creek, Calif., assignor to Shell Oil Company, New York, N.Y., a corporation of Delaware
No Drawing. Filed Mar. 28, 1967, Ser. No. 626,384
Int. Cl. C08f 47/10; C08j 1/26
U.S. Cl. 260—2.5                                9 Claims

ABSTRACT OF THE DISCLOSURE

Finely divided particles having fluorocarbon surfaces, distributed in expandable thermoplastic compositions which contain volatilizable blowing agents, provide extremely effective foam nucleation during expansion of the composition, resulting in a large number of foam bubble nuclei per unit volume.

BACKGROUND OF THE INVENTION

Field of the invention

This invention provides an improvement in the production of solid, cellular thermoplastic articles by expansion of foamable mixtures comprising thermoplastic resins and volatilizable blowing agents. It is particularly applicable to continuous extrusion of such mixtures for the production of articles, such as extruded cellular sheets, having densities in the range from 3–30 pounds per cubic foot (lbs./ft.$^3$). It is especially useful in the foaming of isotactic polypropylene and polymers having similar characteristics.

State of the art

Various methods are known for the production of cellular thermoplastic articles, which are generally referred to as "foam" or "foamed thermoplastic." Methods involving extrusion of mixtures of thermoplastic with volatilizable blowing agents are commercially employed, for example, in the production of foamed polystyrene. Another commonly used method of producing foamed articles of polymer such as polystyrene is by molding of expandable particles of polymer composition containing blowing agent distributed in the composition. Polypropylene foams have been produced to date primarily by utilization of chemically decomposable blowing agents or by methods in which cross-linking of the expanded foam is carried out either by irradiation or by use of chemical cross-linking agents.

In the foaming of molten mixtures of thermoplastics and volatilizable blowing agents, the individual foam bubbles form around nuclei in the melt. Some such nuclei are inherently present. It is known to provide additional nuclei to facilitate the production of fine-celled foams by admixing nucleating additives, also called foam nucleants.

It is known that various types of materials can provide nuclei for foam bubbles in thermoplastic melts and that this can be an important aspect in the production of foamed thermoplastics having desirable physical properties. A variety of nucleants have been employed in a variety of substrates. Examples of materials employed as nucleants are surfactants, dissolved inert gas, gas-liberating thermally decomposable solids, non-decomposing inorganic solids, and materals which provide hot spots, such as low melting metals. The use of some specific organic solids has been disclosed for nucleating polystyrene and related polymers.

In the production of cellular thermoplastic articles by expansion of a molten mixture of the thermoplastic and a dissolved volatilizable blowing agent, bubble formation takes place in the melt as the pressure on the melt is reduced. Typically this pressure drop takes place as the melt passes through a die from the inside of an extruder, where it is at a high pressure and above its melting temperature, to the outside which is at ambient pressure and temperature. A finite amount of time elapses during this expansion, and the mixture moves through a finite distance during this time.

As a bubble is initiated at a nucleating site, the dissolved blowing agent surrounding the bubble diffuses into the bubble. The driving force for bubble formation is the difference between the local pressure and the equilibrium pressure of the dissolved blowing agent. Obviously bubble formation is possible only if the equilibrium pressure is greater than the local pressure. Bubble formation is facilitated by effective nucleation sites; if such sites are present bubbles will be formed when the driving force is relatively low, whereas high driving forces are required when nucleation sites are relatively ineffective.

Although use of nucleation additives according to this invention is not limited to production of cellular product in any particular density range, it is of special advantage for production of cellular products having polymer volume fractions of 0.05 to 0.50, which for polyolefins result in densities in the range of about 3 to about 30 lbs./ft.$^3$.

If a polymer foam of very low density is to be produced, e.g., having a polymer volume fraction less than 0.05, it may not be necessary to provide extremely effective nucleation such as provided by this invention because the necessarily high concentration of dissolved blowing agent results in a high equilibrium pressure and hence provides a large driving force for nucleation.

If a polymer foam of relatively high density is desired, e.g., having a polymer volume fraction greater than 0.50, it is often more practical and economical to employ chemically decomposable rather than volatilizable blowing agents; the method of nucleation according to this invention is not applicable to such systems. Chemically decomposable blowing agents generally are not capable of producing closed-cell thermoplastic foams in the middle range of densities.

SUMMARY OF THE INVENTION

It has now been found that finely divided solids having fluorocarbon surfaces are capable of providing an extremely large number of nucleation centers in melts of thermoplastic polymers of other than fluorocarbon monomers, said melts containing volatilizable liquid blowing agents in solution. Extrusion of such melts results in substantial improvement in the foaming of the polymers. The use of fluorocarbon nucleating agents permits foam extrusion under controlled conditions, resulting in production of foamed articles of excellent quality.

This invention comprises the following embodiments:

(1) A process for producing an expanded thermoplastic material which comprises extruding a mixture of a thermoplastic polymer in the melt state containing dissolved therein a liquid volatilizable blowing agent and suspended therein from about 0.01% to about 2% by weight, based on said polymer, of finely divided particles of a foam nucleating agent of which at least the surface consists of fluorocarbon.

(2) A composition of matter comprising a melt-extrudable thermoplastic polymer, a fluid volatilizable blowing agent distributed therein, and finely divided particles of a foam nucleating agent of which at least the surface consists of fluorocarbon, present in a concentration in the range of 0.01% to 2% by weight.

DESCRIPTION OF THE PRERRED EMBODIMENTS

The nucleating agents of this invention

The nucleating agents employed according to this invention are finely divided particles of which at least the are finely divided solid perfluoro carbons such as the now commercial materials polytetrafluoroethylene (TFE), fluorinated ethylene-propylene (FEP) and polyhexafluoropropylene.

Finely divided solid carrier particles coated with a fluorocarbon material are also suitable for use as nucleants according to this invention. The chemical and physical characteristics of the carrier are not critical since it is the fluorocarbon surface coating that provides the nucleation effect. The coating may be provided in the form of a solid florocarbon of the type mentioned above or as a thin fluorocarbon coating (monolayer) deposited from solution. Representative of suitable carriers are finely divided silicia, alumina, glass and various metals and metal oxides. Representative of suitable fluorocarbon coatings are perfluorobutyric acid, perfluorocaprylic acid, perfluorolauric acid, and fluorochemical surfactants of the type having the general formula $(C_aX_{2a+1})_fZ$ wherein $a$ is typically at least 6 and suitable 7–12; X is hydrogen or fluorine, provided that $C_aX_{2a+1}$ has at least 55% by weight fluorine atoms; $f$ is a small number from 1 to 8, and Z is a water-solubilizing group of which typical groups include acid groups including sulfonic acid groups and their salts, e.g., the sodium salt, and amine and quaternary ammonium groups. Suitable fluorocarbon compounds of this type are known to the art, being summarized in some detail in U.S. 2,937,098 to Green; certain of these compounds are further disclosed and identified in U.S. Pats. 2,559,628, 2,559,751, 2,567,011, 2,597,702, 2,693,485, 2,727,923 and 2,732,398. Fluorocarbon surfactants of this type are commercially available. For purpose of the persent invention, those compounds are preferred in which all or all but one of the atoms X in said formula are fluorine atoms.

Without being limited by any theoretical considerations, it is suggested that a preferred group of fluorocarbon nucleants are those having a "critical surface tension of wetting" $\gamma_c$ of about 20 dynes/cm. or less. Critical surface tension of wetting is described in "Engineering Design for Plastics" edited by Eric Baer, Reinhold Publshing Corp., New York, 1964, pages 695–705.

The particle size of the nucleant additive is not critical so long as the particles are predominantly in the range not exceeding about 20 microns in diameter. The preferred particle size is in the range up to 1 micron e.g., from 0.02 micron to 1 micron.

The lower limit of the concentration of added nucleant could be, theoretically, as little as $10^{-4}$ percent by weight, i.e., 1 part per million; however, it would not generally be practical to obtain even distribution of such a small amount in the polymer mass. The concentration of nucleant will normally be in the range from 0.01% to 1 percent by weight, and will not exceed 2 percent by weight.

In foam nucleation according to this invention it has been found that more than one cell may be nucleated by a single nucleating particle.

Blowing agents

Blowing agents suitable for use in this invention are those which act by volatilization from the dissolved state in the foamable mixture. Generally these are volatile, normally liquid compounds. By volatile blowing agent is meant one which is normally a liquid or gas and which can dissolve in a polymer melt and volatilize therefrom under and which can dissolve in a polymer melt and volalize therefrom under controlled conditions, and preferably below 320° F. Preferred agents have a boiling point below about 100° C. and preferably between 10° C. and 100° C. These materials may be hydrocarbons or substituted hydrocarbons or mixtures thereof. Examples of such materials include, among others propane, butane, pentane, isopentane, cyclopentane, heptane, petroleum ethers boiling within the above-noted range, benzene, dichlorodifluoromethane, dichlorotetrafluoroethane, trichlorofluoromethane, difluorochloroethane, and the like. It is permissible, and in some cases desirable, to use mixtures of the above agents, and preferably mixtures of hydrocarbons or mixtures of aliphatic hydrocarbons and normally liquid lower halogenated hydrocarbons.

A preferred group of blowing agents are the alkanes containing from 4 to 6 carbon atoms per molecule. Lower paraffins, e.g., those of 4 to 5 carbon atoms per molecule, are very suitable for the use with polypropylene.

The volatilizable blowing agent generally comprises from 3 to 50% by weight, based on the resin component of the composition. The amount of blowing agent is selected in accordance with the desired density of the foamed product.

Foamable polymers

The nucleants of this invention are particularly advantageous in production of expanded cellular articles from resins consisting predominantly of crystallizable stereoregular, and particularly of isotactic, polypropylene. Following conventional terminology, reference to "crystallizable" or "stereoregular" polypropylene means, unless the context indicates otherwise, solid polypropylene having a high degree of stereoregularity reflected in at least 50% crystallinity, usually between 60 and 70% (as determined by X-ray diffraction analysis, infrared anlysis or comparable methods), when solified under conditions which favor crystallization. The viscosity average molecular weight of such stereoregular polypropylene is usually at least about 40,000 and generally between 100,000 and 1,600,000. The intrinsic viscosity, measured in decalin at 150° C., expressed in dl./g., may be as low as 0.8 or less and as high as 12 or more.

Foamed articles can also be prepared according to this invention from crystalline linear polymers of other alphamonoolefins, particularly of those having from 2 to 8 carbon atoms, such as ethylene, 1-butene, 3-mehyl-1-butene, 4-methyl-1-pentene, 4-methyl-1-hexene and the like, which are known to produce crystalline polymers. All of these polymers are produced by so-called low pressure polymerization methods which are now well known. Polyethylene and polypropylene resins are now staple materials of commerce and polymers of other olefins can be similarly prepared. Non-rubbery copolymers of the above-mentioned olefins, such as block copolymers, are also suitable for use in this invention.

While the invention is of particular advantage with the above-described polymers, it may also be employed in the production of expanded articles from other thermoplastic polymers of fluorine-free monomers. This group includes, in addition to the above-described polyolefins, polymers and copolymers of vinylaromatics such as styrene and alpha-methylstyrene, including copolymers with non-aromatic monomers, such as so-called ABS (a terpolymer of styrene, acrylonitrile and butadiene) and SAN (a copolymer of styrene and acrylonitrile); acrylates such as methyl methacrylate; polyvinyl chloride and its modifications such as with polyvinyl acetate; polyvinylidene chloride; and a variety of other polymers, such as nylons, polycarbonates, polyesters, polyethers, cellulose derivatives, and mixtures of such polymers with each other or with other materials such as wax.

Methods of practicing the invention

Any suitable method may be employed for incorporating the nucleant in the foamable mixture. For example, dry, powdery TFE may be blended with some or all of the dry powdery thermoplastic resin prior to melting the resin and combining the volatilizable blowing agent therewith.

In another method, a slurry of the nucleant in a volatilizable carrier liquid may be distributed on part or all of the thermoplastic resin which may be in a powdery or other particulate form, and the carrier liquid thereafter removed by evaporation to obtain polymer coated or blended with nucleant particles.

In another method the nucleant may be added to a solution or slurry of the thermoplastic polymer prior to final recovery of polymer in dry solid form from the polymerization process.

In another method the nucleant may be introduced into the melted polymer mass by inclusion of the nucleant in a liquid stream of volatilizable blowing agent which is mixed with the polymer mass in an extruder.

Methods and apparatus for the production of foamed articles from thermoplastic mixtures and volatilizable blowing agents are well known and have been described in texts and patents. For the sake of illustration, methods and apparatus described in Ser. No. 289,114, filed June 19, 1963, now U.S. Pat. No. 3,310,617, may be employed in the practice of this invention.

In another suitable method the foamed articles are prepared by feeding a particulate mixture of the thermoplastic composition to be foamed, including the desired fluorocarbon foam nucleant, to the feed hopper of a plastics screw extruder wherein the composition is compressed in a forwarding zone and heated until it is converted to a melt, passed through a metering zone into a mixing zone in which volatilizable blowing agent is introduced under pressure and evenly distributed in the mixture, and then passed through a cooling zone in which it is cooled to slightly above its solidification temperature while still under pressure; this mixture is then extruded through a die into a zone of lower, usually ambient, temperature and pressure.

In any suitable extrusion method, the die may be designed to form the extruded mass into any desired shape, such as a rod or flat sheet, or it may be an annular die for extrusion of the mass as a bubble which is expanded by a gas, e.g., air, maintained inside the bubble and is then collapsed on a collapsing frame to produce foamed sheet.

The nucleating agents of this invention can be used to advantage in the production of foamed articles from expandable thermoplastic particles in which a volatilizable foaming agent is contained in beads, nibs, or powdered particles of the thermoplastic composition.

The following examples are for the purpose of illustration only and are not to be regarded as limiting the invention. Unless otherwise indicated, parts and percentages in the examples and throughout the specification are given by weight.

EXAMPLE I

This example illustrates the unusual effectiveness of fluorocarbon nucleants in polypropylene when compared with several known foam nucleants.

In a study of the effectiveness of various nucleants, a 1.5 mm. thick plaque of pressed polypropylene containing a nucleation additive is equilibrated with blowing agent in a test cell at a controlled temperature above the melting point of the polymer and at a controlled partial pressure of blowing agent, and the cell is then suddenly depressured to atmospheric pressure and cooled. The plaques are prepared by hot-pressing powdered polypropylene (polypropylene fluff) in which the additive has been dispersed, if particulate, and precipitated, if soluble.

In the tests shown in Table 1, unless otherwise stated, the polypropylene had an intrinsic viscosity of 5.4 dl./g., measured in decalin at 125° C.; the nucleant additive was present in concentration of 0.5 phr. (parts per hundred parts of resin); the blowing agent was isopentane; the blowing agent partial pressure was 150 p.s.i., and the temperature was 350° F.

The resulting sample foams were examined for foam density and bubble concentration (nuclei number density, i.e., number of bubbles per cc. of unfoamed polymer). The nucleant utilization, reported as nuclei per particle, was calculated from the bubble concentration and the nucleant particle size and density.

TABLE 1

| Example | Nucleant Material | Particle size, microns | Method of incorporation | Foam density, lb./ft.$^3$ | Nuclei number density, per cc. of polymer | Nucleant utilization, nuclei per particle |
|---|---|---|---|---|---|---|
| I-1 | None | | | ~50 | ~5×10$^2$ | |
| I-2 | Glycerine | | Liquid | (f) | 37 | 2.6×10$^2$ | |
| I-3 | Detergent $^a$ | do | (f) | 35 | 1.4×10$^3$ | |
| I-4 | Silica sand | 1.5 | (g) | 37 | 1.2×10$^3$ | 1.3×10$^{-6}$ |
| I-5 | Polyvinyl alcohol | | Unknown | (f) | 51 | 4.7×10$^2$ | |
| I-6 | Polyvinyl alcohol supported on silica | 1.5 | (h) | 52 | 2.4×10$^2$ | 2.4×10$^{-7}$ |
| I-7 $^b$ | TFE $^c$ | 20 | (g) | 3–10 | 10$^6$–10$^7$ | 3–20 |
| I-8 | TFE latex | Unknown $^d$ | (i) | 20 | 8.2×10$^6$ | |
| I-9 | do | | | 15 | 8.6×10$^6$ | |
| I-10 | TFE $^e$ | 10 | (j) | 12 | 8×10$^5$ | 0.2 |

$^a$ Triton X-100—general formula C$_8$H$_{17}$(C$_6$H$_4$)(OCH$_2$CH$_2$)$^x$OH; x=9–10.
$^b$ Results of several individual experiments.
$^c$ Polytetrafluoroethylene, powder.
$^d$ TFE particle size in latex originally about 0.2 μ, but effective particle size as nucleant not known due to agglomeration.
$^e$ TFE powder cryogenically processed.
$^f$ Nucleant dissolved in solvent, solution distributed over polymer powder and solvent evaporated.
$^g$ Nucleant dispersed in liquid; suspension distributed over polymer powder or nibs and liquid evaporated.
$^h$ Nucleant dissolved in solvent, solid carrier dispersed in the solution, resulting suspension used as in (g).
$^i$ Polymer powder dispersed in liquid, latex added to slurry, liquids removed by filtration.
$^j$ Nucleant powder dry-mixed with polypropylene powder.

The tests summarized in Table 1 are made under conditions which do not favor cell nucleation, the polymer mass being relatively viscous—the polymer having the relatively high I.V. of 5.4—and the driving force for bubble formation being relatively low—less than 150 p.s.i. Under such severe conditions, particulate TFE is shown to be an excellent nucleant, providing a large number of cell nuclei.

EXAMPLE II

The procedure of Example I was repeated with polystyrene. The foam nucleant was the same TFE polymer employed in Example I-7; the temperature was 266° F. rather than 350° F. The resultant foam had a density of 4 lb./ft.$^3$. The number density of nuclei was about 10$^6$ per cc. and nucleant utilization about 2.

EXAMPLE III

This example illustrates a preferred mode of carrying out the process of this invention. A number of runs were made utilizing conditions and materials shown in Table 2 in which are also shown the results of said runs.

(A) Powdered polymer was combined with finely divided polytetrafluoroethylene of the kind employed in Example I-7 and the mixture placed in the mixing hopper of an extruder of the type illustrated in the drawing of U.S. Pat. No. 3,310,617. The hopper was then evacuated to 29 inches of vacuum, and blowing agent was boiled over into the hopper while the polymer particles were stirred. The combined mixture was further stirred to effect an even distribution of the blowing agent on the polymer particles. The stirrer and crammer rotation was then reversed so as to cram powder into the extruder. The mixture passed through a compression section in which it was melted, a metering section, and a heat exchanger section in which it was cooled. The melt was then extruded through an annular sheet-forming die. Die gaps employed were in the range from about 0.01 to 0.04 inch. The pressure drop across the die was about 900 p.s.i. The resulting product was a cellular polymer sheet.

solved therein as foaming agent (b) a volatile fluid organic compound which is soluble in said molten mixture, and having uniformly distributed therein as foam nucleating agent (c) an effective amount in the range from about 0.01% to about 2% by weight, based on said polymer, of finely divided particles having fluorocarbon surfaces.

TABLE 2

| Example | Polymer Type | I.V. | Blowing agent Type | Concentrate phr. | Nucleant Type | Concentrate, phr. percent | Extruder outlet temp., °F. | Foam density, lbs./ft.$^3$ | Nucleant particle number density, cc.$^{-1}$ | Nuclei number density, per cc. of polymer |
|---|---|---|---|---|---|---|---|---|---|---|
| III-1 | Polypropylene | 5 | iC$_5$ | 4.5 | TFE | 0.2 | 385 | 11.8 | 2×10$^5$ | 1.7×10$^6$ |
| III-2 | do | 5 | iC$_5$ | 8.6 | TFE | 1.0 | 386 | 16.8 | 10$^6$ | 6.7×10$^5$ |
| III-3 | do | 5 | iC$_3$ | 15 | TFE | 0.2 | 384 | 16 | 2×10$^5$ | 5.6×10$^5$ |
| III-4 | do | 7.7 | iC$_4$ | 15 | TFE | 1.0 | 435 | 25 | 10$^6$ | 1.4×10$^6$ |
| III-5 | Thermoplastic ethylene-propylene copolymer. | 7.7 | iC$_5$ | 20 | TFE | 1.0 | 438 | 15.7 | 10$^6$ | 3.0×10$^6$ |
| III-6 | do | 4.0 | iC$_5$ | 15 | TFE | 1.0 | 350 | 13.7 | 10$^6$ | 4.4×10$^5$ |
| III-7 | Polyvinylchloride | 4.0 | iC$_5$ | 4.3 | TFE | 1.0 | 348 | 14.1 | 10$^6$ | 9.9×10$^4$ |
| III-8 | do | | | Acetone | 20 | TFE | 1.0 | 260 | 10.5 | 10$^6$ | 2.2×10$^5$ |
| III-9 | do | | | Acetone | 25 | TFE | 1.0 | 280 | 11 | 10$^6$ | 2.1×10$^7$ |

Examples III-1 through III-9 illustrate the effectiveness of polytetrafluoroethylene as nucleant additive in polypropylene, thermoplastic ethylene-propylene copolymers, and polyvinyl chloride under conditions leading to different foam densities between about 10 and 25 lbs./ft.$^3$, and utilizing either isopentane or acetone as blowing agent.

In related experiments utilizing 0.5% of finely divided silica as nucleant in extrusion of foamed strands of polypropylene of 2.2 I.V., which is relatively easy to nucleate, and utilizing 10 to 17 phr. of isopentane as blowing agent and an extruder outlet temperature of 290-318° F., foam cell densities of only 1.6×10$^3$ to 3×10$^4$ were obtained. In other related experiments, celite and talc were used in the same polypropylene at concentrations of 1 phr., utilizing 3 and 5 phr., respectively of trichloromethane blowing agent and extruder outlet temperature of 380 and 320° F., respectively; these runs resulted in foam cell number densities of about 2×10$^2$ and about 3×10$^3$ nuclei per cc., respectively, with foams of 31 and 22 lbs./ft.$^2$.

EXAMPLE IV

Substituting for the polytetrafluoroethylene particles in Examples I-7 and III-1 through III-9 similar amounts of similarly sized particles of fluorinated ethylene-propylene results in production of suitable foams, having similar nuclei and number densities.

EXAMPLE V

In place of the silica sand nucleant of Example I-4 there is employed fluorocarbon-coated silica sand in which the silica sand support is the same as that of Example I-4, but it is coated with a commercial fluorocarbon surfactant of the type (C$_a$F$_{2a+1}$)$_x$SO$_3$Na. The resulting polymer foam has a substantially greater nuclei number density than that of Example I-4.

I claim:
1. A process for producing a cellular article from a polymer composition capable of being foamed which comprises extruding a molten mixture of (a) thermoplastic organic polymer selected from the group consisting of linear polymers and copolymers of alpha-monoolefins, polymers and copolymers of vinylaromatics, acrylates, polymers and copolymers of vinyl chloride, polyvinylidene chloride, nylons, polycarbonates, polyesters, polyethers, polymeric cellulose derivatives, and mixtures of such polymers with each other, having uniformly dissolved therein as foaming agent (b) a volatile fluid organic compound which is soluble in said molten mixture, and having uniformly distributed therein as foam nucleating agent (c) an effective amount in the range from about 0.01% to about 2% by weight, based on said polymer, of finely divided particles having fluorocarbon surfaces.

2. The process according to claim 1 wherein said polymer is polystyrene.

3. The process according to claim 1 wherein said polymer is polyvinylchloride.

4. The process according to claim 1 wherein said polymer is polypropylene.

5. The process according to claim 4 wherein said foam nucleating agent is polytetrafluoroethylene consisting predominantly of particles not exceeding 20 microns in diameter.

6. A composition of matter suitable for conversion to foamed thermoplastic articles upon heating, which comprises a thermoplastic polymer selected from the group consisting of linear polymers and copolymers of alpha-monoolefins, polymers and copolymers of vinylaromatics, acrylates, polymers and copolymers of vinyl chloride, polyvinylidene chloride, nylons, polycarbonates, polyesters, polyethers, polymeric cellulose derivatives, and mixtures of such polymers with each other, from about 0.01% to about 2% by weight of finely divided particles having fluorocarbon surfaces as foam nucleating agents, and from about 3% to 20% by weight of volatilizable foaming agent distributed in said composition.

7. A composition of matter according to claim 6 wherein said foam nucleating agent is polytetrafluoroethylene consisting predominantly of particles not exceeding 20 microns in diameter.

8. A process for producing a cellular article from a polymer composition capable of being foamed which comprises extruding a molten mixture of (a) thermoplastic organic polymer selected from the group consisting of linear polymers and copolymers of alpha-monoolefins, polymers and copolymers of vinylaromatics, acrylates, polymers and copolymers of vinyl chloride, polyvinylidene chloride, nylon, polycarbonates, polyesters, polyethers, polymeric cellulose derivatives, and mixtures of such polymers with each other, having uniformly dissolved therein as foaming agent (b) a volatile fluid organic compound which is soluble in said molten mixture, and having uniformly distributed therein as foam nucleating agent (c) an effective amount in the range from about 0.01% to about 2% by weight, based on said polymer, of finely divided solid carrier particles coated with a fluorocarbon material.

9. A compisition of matter siutable for conversion to foamed thermoplastic articles upon heating, which comprises a thermoplastic polymer selected from the group consisting of linear polymers and copolymers of alpha-monoolefins, polymers and copolymers of vinylaromatics, acrylates, polymers and copolymers of vinyl chloride, polyvinylidene chloride, nylons, polycarbonates, polyesters, polyethers, polymeric cellulose derivatives, and mixtures of such polymers with each other, from about 0.01% to about 2% by weight of finely divided solid carrier particles coated with a fluorocarbon material as foam nucleating agent, and from about 3% to 20% by weight of volatilizable foaming agent distributed in said composition.

References Cited

UNITED STATES PATENTS

| | | | |
|---|---|---|---|
| 2,577,743 | 12/1951 | Delong | 260—2.5E |
| 2,945,827 | 7/1960 | Henning | 260—2.5E |
| 3,005,795 | 10/1961 | Busse et al. | 260—900 |
| 3,067,147 | 12/1962 | Ruben et al. | 260—2.5E |
| 3,072,583 | 1/1963 | Randa | 260—2.5E |
| 3,072,584 | 1/1963 | Karpovich | 260—2.5E |

SAMUEL H. BLECH, Primary Examiner

M. FOELAK, Assistant Examiner

U.S. Cl. X.R.

117—100; 260—17, 17.4, 28.5, 37, 40, 41, 41.5, 857, 873, 876, 887, 893, 98, 900